(12) United States Patent
Sterki

(10) Patent No.: US 7,673,535 B2
(45) Date of Patent: Mar. 9, 2010

(54) GEARWHEEL SET FOR A TRANSMISSION

(75) Inventor: Arnold Sterki, Rapperswil (CH)

(73) Assignee: Sterki AG, Wolfhausen (CH)

( * ) Notice: Subject to any disclaimer, the term of this patent is extended or adjusted under 35 U.S.C. 154(b) by 636 days.

(21) Appl. No.: 11/583,300

(22) Filed: Oct. 19, 2006

(65) Prior Publication Data

US 2007/0277631 A1    Dec. 6, 2007

(30) Foreign Application Priority Data

Jun. 16, 2006    (DE) .................. 10 2006 028 181

(51) Int. Cl.
*F16H 55/14* (2006.01)
*F16H 55/18* (2006.01)
*F16F 15/14* (2006.01)

(52) U.S. Cl. .................. 74/461; 74/574.2; 74/409

(58) Field of Classification Search .................. 74/409, 74/444, 461, 574.2

See application file for complete search history.

(56) References Cited

U.S. PATENT DOCUMENTS

| | | | | |
|---|---|---|---|---|
| 1,317,232 A * | 9/1919 | Spillman | .................. | 74/440 |
| 3,803,935 A * | 4/1974 | Nozawa | .................. | 74/409 |
| 4,739,670 A * | 4/1988 | Tomita et al. | .................. | 74/409 |
| 5,542,306 A * | 8/1996 | Fernandez | .................. | 74/15.86 |
| 6,148,684 A * | 11/2000 | Gardiner | .................. | 74/440 |
| 6,415,674 B1 * | 7/2002 | Davis et al. | .................. | 74/409 |
| 7,004,294 B2 * | 2/2006 | Williams | .................. | 188/378 |
| 7,007,565 B2 * | 3/2006 | Allen et al. | .................. | 74/333 |

FOREIGN PATENT DOCUMENTS

DE        103 13 992        12/2003

* cited by examiner

*Primary Examiner*—Thomas R Hannon
*Assistant Examiner*—Justin Krause
(74) *Attorney, Agent, or Firm*—Bachman & LaPointe, P.C.

(57) ABSTRACT

In a gearwheel set for a transmission, in particular for a transmission with a PTO (Power Take-Off) accessory, at least two gearwheels (6, 10) bearing against one another, and the gearwheels (6, 10) being rotatable in relation to one another, and both gearwheels (6, 10) having recesses (8.1-8.3; 11.1-11.3) which form with one another a reception space for an actuator (1), the actuator (1) is to be radially movable in the reception space, and the recesses (8.1-8.3; 11.1-11.3) are to have a different shape.

5 Claims, 3 Drawing Sheets

GEARWHEEL SET FOR A TRANSMISSION

CROSS REFERENCE TO RELATED APPLICATIONS

This case is a national application which claims priority of German Application No. 10 2006 028 181.0 filed Jun. 16, 2006.

BACKGROUND OF THE INVENTION

The invention relates to a gearwheel set for a transmission, in particular for a transmission with a PTO (Power Take-off) accessory, at least two gearwheels bearing against one another, and the gearwheels being rotatable in relation to one another, and both gearwheels having recesses which form with one another a reception space for an actuator.

PTO devices of this type are often used in motor trucks in which hydraulic devices requiring considerable effort have to be operated. The PTOs are attached, for example, to a transmission and are activated when, for example, a hydraulic pump is to be driven. Reference is made here, in particular, to U.S. Pat. No. 5,542,306 which contains several versions of PTO devices.

An essential component of a PTO is two gearwheels which transfer a rotational movement from a transmission to, for example, a rotary shaft of a pump. For this purpose, the gearwheels engage into corresponding toothings of the transmission or of the pump shaft. There is obviously in this case often also play in the engagements, particularly at critical rotational speeds of approximately 500 to 600 rev/min, a considerable amount of noise being generated. At the same time, this consequently also entails a higher wear of the gearwheels.

A gearwheel set of the above-mentioned type is known from DE 103 13 992 A1. There, the gearwheels are supported relative to one another via at least one force accumulator, the force accumulators being arranged in tangential bores. In practice, this gearwheel set has certainly proved appropriate, but in the case of specific revolutions it causes noises, that is to say the transmission howls. This is undesirable.

The object of the invention is to improve a gearwheel set of the above-mentioned type such that, on the one hand, its functioning capacity is not impaired and, on the other hand, there is no increase in the generation of noise.

SUMMARY OF THE INVENTION

The object is achieved by providing an actuator wherein the actuator is radially movable in the reception space, and the recesses have a different shape.

This arrangement ensures a form fit between the gearwheels via the actuator, the effect of this being that the gearwheels are braced relative to one another, as desired, or after the necessary compensation of gearwheel play, without any noise being generated. The actuator is to be guided in the reception space such that it is always in contact with walls of the recesses.

So that bracing, that is to say rotation, of at least one of the gearwheels takes place, for example, a width of the two recesses transverse to the radial orientation may be different. The actuator is then guided radially outward in a recess, but, during this radial movement, takes up the other gearwheel, so that rotation occurs.

In a particularly preferred exemplary embodiment of the invention, one recess is to be shaped approximately elliptically, its major axis running radially or along a radius in the gearwheel. So that, for example, a base of an actuator can move in this recess, it is advisable for the two sidewalls of the ellipse, which normally form the secondary vertices, to be shaped so as to run at least partially in parallel. The sidewalls then maintain a distance from one another which is slightly above the width of this base of the actuator.

The other recess, which is located in the other gearwheel, is shaped elliptically only in the widest sense and possesses a minor axis which has a smaller length than the minor axis of the first recess. This means that the first recess extends beyond the second recess.

Furthermore, the major axis of this other recess is to run at an angle with respect to a radius of the gearwheel. This means that this recess is set obliquely, the two sidewalls of the other recess, elliptical in the widest sense, which normally form the secondary vertices, likewise running at least partially in parallel and being set at an angle with respect to the radius.

Since, as mentioned above, the actuator has a length which is smaller than the length of the recesses, the actuator, which preferably consists of the above-mentioned base and of a sliding block, can move radially along these recesses. The base thus possesses a circumference which corresponds approximately to the circumference of the first elliptical recess, but has a shorter length of the radial major axis than the length of this recess.

By contrast, the sliding block is likewise to be set at an angle with respect to the radius and have a sliding surface which co-operates with one of the sidewalls of the other recess. When the actuator is pressed outward as a result of the centrifugal force of the wheel set rotating at high speed, this sliding surface also slides along on the obliquely set sidewall of the other recess and presses this about a center point of the wheel set, so that this gearwheel is rotated with respect to the other gearwheel.

Preferably, the actuator consisting of base and sliding block is to be produced in one piece and consist of a wear-resistant material, such as, for example, metal or ceramic.

Furthermore, there is provision for the actuator to be supported in one of the recesses via at least one force accumulator. This force accumulator acts counter to the centrifugal force of the actuator, so that it brings the actuator into its initial position again in the event of a reduction in the rotation of the gearwheel set.

BRIEF DESCRIPTION OF THE DRAWINGS

Further advantages, features and details of the invention may be gathered from the following description of preferred exemplary embodiments and with reference to the drawing in which.

DETAILED DESCRIPTION

Figure 1:
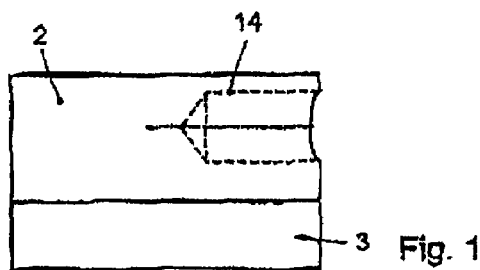
FIG. 1 shows a side view of an actuator for a wheel set according to the invention.
Figure 2:
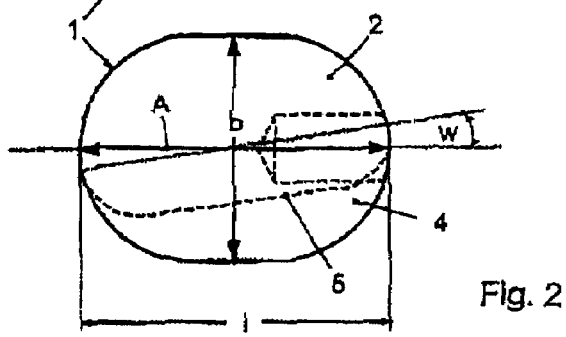
FIG. 2 shows a top view of the actuator according to FIG. 1.

FIGS. 1 and 2 show an actuator 1 which consists of a base 2 and of a sliding block 3. Both are connected to one another in one piece and produced, for example, from metal. However, another material, such as, in particular, ceramic, may also be envisaged here.

The base 2 has a width b and possesses a major axis A of length l. By contrast, the sliding block 3 is designed with a smaller width, this taking place by means of a setback 4. A sliding surface 5 is thereby formed, which runs at an angle w with respect to the major axis A.

Figure 3:
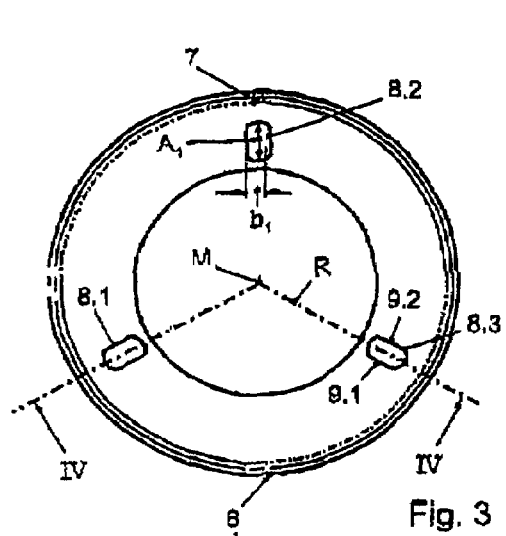
FIG. 3 shows a top view of a basic wheel of a gearwheel set according to the invention.

FIG. 3 shows a top view of a basic wheel 6 possessing a circumferential toothing, of which only one tooth 7 is indicated. This basic wheel 6 has formed integrally in it three recesses 8.1, 8.2 and 8.3 which are designed identically and are offset in each case through 120° with respect to one another. Each recess 8.1 to 8.3 has an elliptical shape with a width $b_1$ and a length $l_1$. A major axis $A_1$ runs in this case in the direction of a radius R which runs radially outward from a center point M of the basic wheel 6. Two likewise radially running sidewalls 9.1 and 9.2 of the recesses 8.1 to 8.2 run at least partially parallel to one another and approximately parallel to the radius R.

Figure 5:
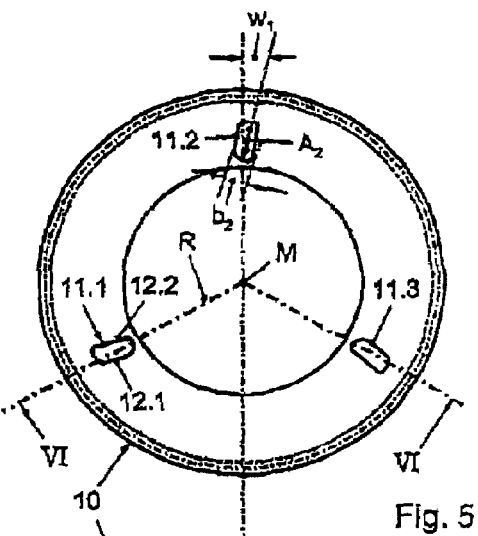
FIG. 5 shows a top view of a tension wheel according to the invention.
Figure 4:
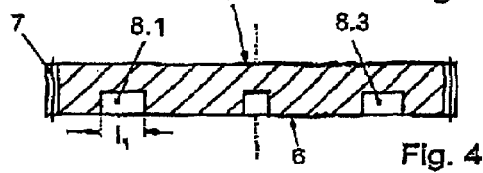
FIG. 4 shows a section through FIG. 3 along the line IV-IV.
Figure 6:
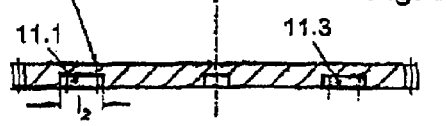
FIG. 6 shows a section through the tension wheel according to FIG. 5 along the line VI-VI.

A tension wheel 10 illustrated in FIGS. 5 and 6 likewise possesses three recesses 11.1 to 11.3 which again are designed identically and are arranged so as to be offset through 120° with respect to one another. Each of these recesses 11.1 to 11.3 possesses a shape which is elliptical in the widest sense, although a width $b_2$ is smaller than the width $b_1$ of the recesses 8.1 to 8.3. By contrast, a length $l_2$ corresponds approximately to the length $l_1$ of the recesses 8.1 to 8.3.

It is essential in this case that a major axis $A_2$ runs at an angle $b_1$ with respect to the radius R. The two sidewalls 12.1 and 12.2 likewise run at an angle with respect to the radius R.

Figure 7:
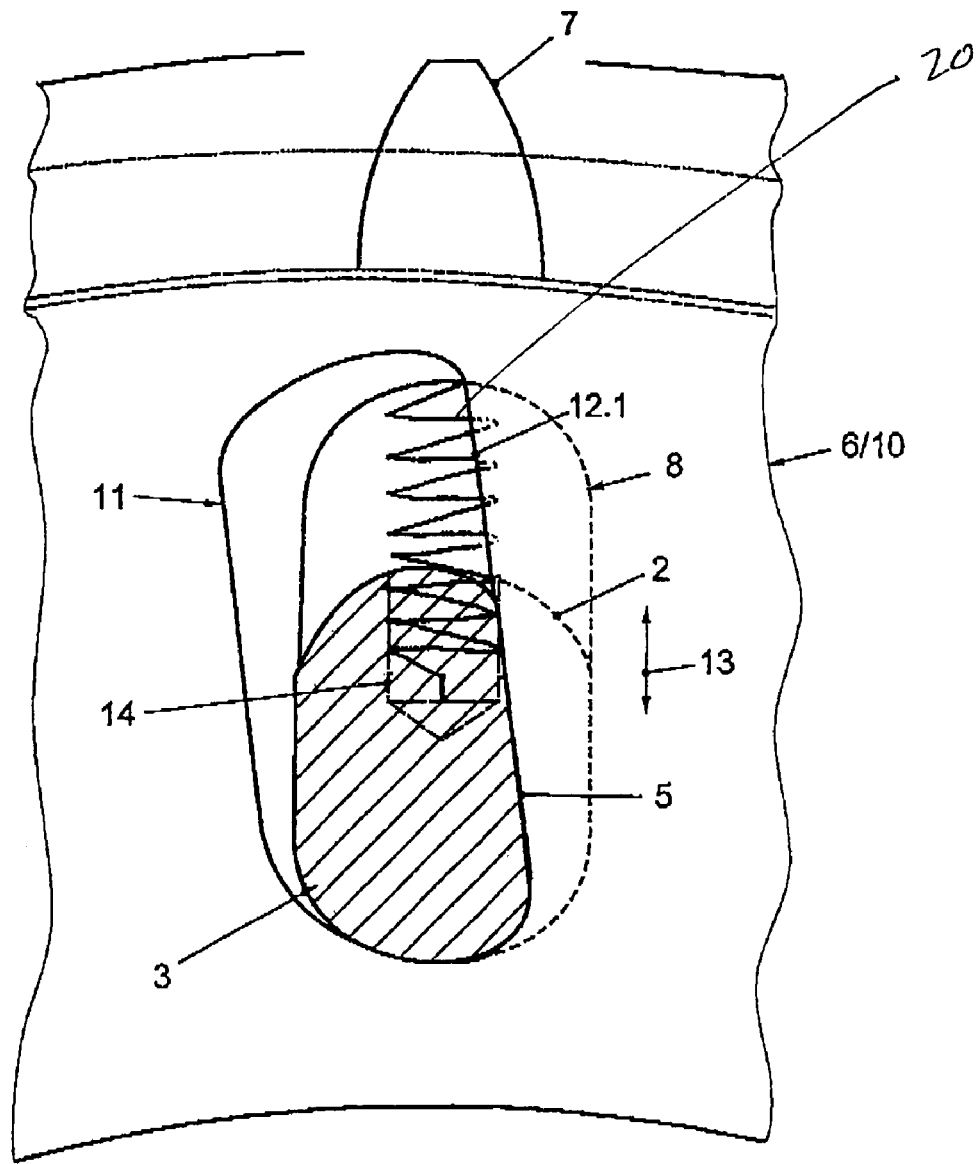
FIG. 7 shows a partially illustrated detail from a gearwheel set according to the invention.
Figure 8:
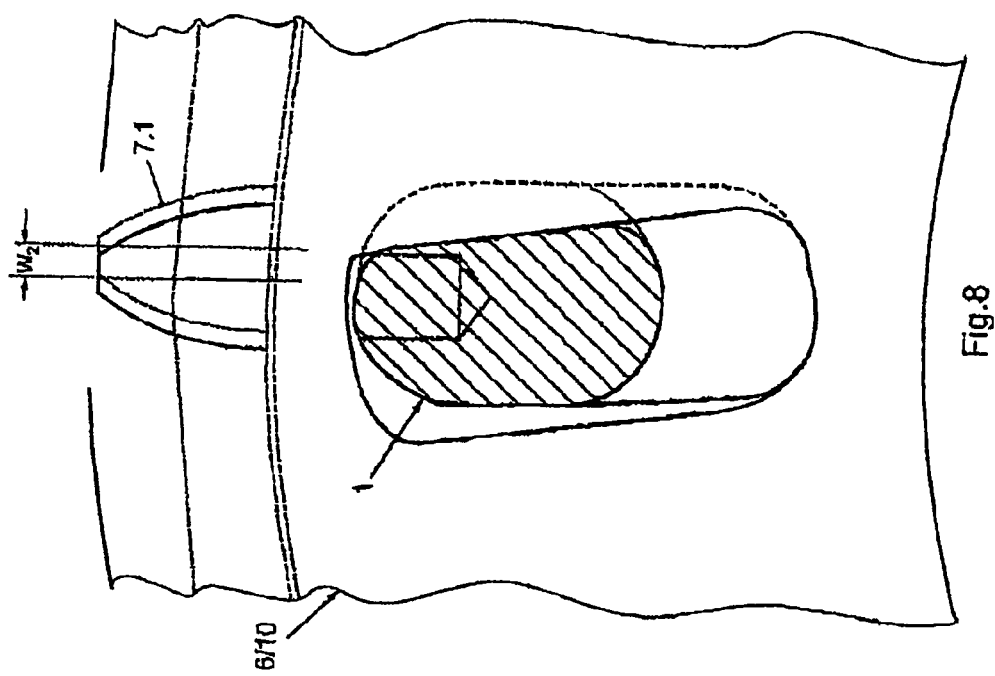
FIG. 8 shows a top view of the detail of the gearwheel set according to FIG. 7 in a further position of use.

The functioning of the present invention is explained in more detail with reference to FIGS. 7 and 8. It can be seen in this case that the recess 8 of the basic wheel 6 is located below, but in the region of the recess 11 of the tension wheel 10. The actuator 1 is seated with its base 2 in the elliptical recess 8. However, since its length l is smaller than the length $l_1$ of the recess 8, the actuator 1 can move radially in the direction of the double arrow 13 of the recess 8.

The actuator 1 engages with the sliding block 3 into the other recess 11, the sliding surface 5 of the sliding block 3 bearing against an obliquely set sidewall 12.1 of the recess 11.

If the gearwheel set 6/10 is then set in rotational movement, the actuator 1 presses outward under the action of the centrifugal force. If, for example, the actuator weighs 5 g, this weight increases to about 100 kg due to the centrifugal force at about 4000 revolutions of the gearwheel set. Under this weight, the actuator 1, when it slides radially outward, also presses with the sliding surface 5 against the sidewall 12.1 of the tension wheel 10. At the same time, the base 2 slips radially outward in the recess 8, so that the tension wheel 10 is rotated by an amount in relation to the basic wheel 6. An offset of the tooth 7.1, indicated by dots, of the tension wheel 10 with respect to the tooth 7 of the basic wheel 6 thereby takes place. As a result, a possible play in a gearwheel transmission is compensated. The offset takes place through the angle $w_2$.

As soon as the rotational speed of the gearwheel set is reduced, the actuator 1 should also move back into its initial position again. This takes place preferably under the pressure of a helical spring 20 which is inserted into a blind hole 14, indicated by dashes, in the actuator 1 and preferably in the base 2 there.

An essential parameter of the present invention is the angle $w_1$ or w at which the sliding surface 5 or the major axis $A_2$ of the recess 11 is set with respect to the radius R. The larger this selected angle becomes, the less pressure can be exerted on the tension wheel.

The invention claimed is:

1. A gearwheel set for a transmission with a power-take-off accessory comprising:
    a first gearwheel, said first gearwheel having a plurality of first identical recesses;
    a second gearwheel, said second gearwheel having a plurality of second identical recesses;
    said first gearwheel and said second gearwheel define a reception space for an actuator;
    said actuator includes (1) a base seated in the plurality of first identical recesses of the first gearwheel and (2) a sliding block seated in the plurality of second identical recesses of the second gearwheel;
    said plurality of first identical recesses are of substantially elliptical shape and have a major axis ($A_1$) which run in a direction of a radius (R) running radially outward from a center point (M) of the first gearwheel and a width ($b_1$) and length ($l_1$);
    said plurality of second identical recesses are of substantially elliptical shape and have a width ($b_2$) which is smaller than width ($b_1$) and a length ($l_2$) approximately equal to length ($l_1$); and
    wherein the actuator is movable between two positions in the reception space relative to the first gearwheel and second gearwheel as a function of centrifugal force resulting from rotation of the gearwheel set.

2. Gearwheel set according to claim 1, wherein the base has a circumference which corresponds approximately to a circumference of the plurality of first identical recess.

3. Gearwheel set according to claim 1, wherein the base and sliding block are one piece.

4. Gearwheel set according to claim 1, wherein the actuator is supported via at least one force accumulator.

5. Gearwheel set according to claim 4, wherein the force accumulator acts on the actuator counter to the centrifugal force.

* * * * *